(12) United States Patent
Hortnagl

(10) Patent No.: US 9,271,545 B2
(45) Date of Patent: Mar. 1, 2016

(54) CLAMPING APPARATUS FOR CLAMPING AT LEAST ONE STRAP

(71) Applicant: ABA Hortnagl GmbH, Fulpmes (AT)

(72) Inventor: Andreas Hortnagl, Fulpmes (AT)

(73) Assignee: ABA HORTNAGL GMBH, Fulpmes (AT)

( * ) Notice: Subject to any disclaimer, the term of this patent is extended or adjusted under 35 U.S.C. 154(b) by 218 days.

(21) Appl. No.: 13/928,903

(22) Filed: Jun. 27, 2013

(65) Prior Publication Data

US 2014/0000067 A1 Jan. 2, 2014

(30) Foreign Application Priority Data

Jun. 28, 2012 (AT) .................................. A 717/2012

(51) Int. Cl.
*A44B 11/00* (2006.01)
*B60P 7/06* (2006.01)
*A44B 11/06* (2006.01)
*B60P 7/08* (2006.01)

(52) U.S. Cl.
CPC ............... *A44B 11/06* (2013.01); *B60P 7/0838* (2013.01); *Y10T 24/4077* (2015.01)

(58) Field of Classification Search
None
See application file for complete search history.

(56) References Cited

U.S. PATENT DOCUMENTS

| | | |
|---|---|---|
| 2,754,560 A | 7/1956 | Warner et al. |
| 2,852,827 A | 9/1958 | Arnold |
| 3,099,055 A | 7/1963 | Huber |
| 3,293,713 A | 12/1966 | Gaylord |
| 3,328,856 A | 7/1967 | Jonas |
| 3,574,342 A | 4/1971 | Berns |
| 3,641,630 A | 2/1972 | Farley |
| 3,686,715 A | 8/1972 | Brodnicki |
| 3,852,855 A | 12/1974 | Bengtsson |
| 4,118,833 A | 10/1978 | Knox et al. |
| 4,608,735 A | 9/1986 | Kasai |
| 4,726,625 A | 2/1988 | Bougher |
| 4,809,953 A | 3/1989 | Kurita et al. |
| 4,843,688 A | 7/1989 | Ikeda |
| 5,058,244 A | 10/1991 | Fernandez |
| 5,331,726 A | 7/1994 | Suh |
| 6,665,913 B2 | 12/2003 | Kosh et al. |
| 7,712,191 B2 | 5/2010 | Huang |
| 2004/0158955 A1 | 8/2004 | Acton et al. |
| 2010/0122437 A1 | 5/2010 | Hortnagl |
| 2011/0209314 A1* | 9/2011 | Miller ........................ 24/68 CD |
| 2013/0326848 A1 | 12/2013 | Strahl |

FOREIGN PATENT DOCUMENTS

| | | |
|---|---|---|
| AT | 4661472 | 3/1974 |
| AT | 506290 | 8/2009 |
| AU | 4661472 A1 | 3/1974 |

(Continued)

*Primary Examiner* — Jack W Lavinder
(74) *Attorney, Agent, or Firm* — Volpe and Koenig, P.C.

(57) ABSTRACT

A clamping apparatus for clamping at least one strap (3), wherein the clamping apparatus has a basic body (1) on which are arranged at least two basic body clamping bodies (5, 17) which are realized as webs for winding the strap (3) around, characterized in that at least one third basic body clamping body (4), which is realized as a lever which is pivotable in relation to the basic body (1), is arranged on the basic body (1), wherein the third basic body clamping body (4) is pivotable into a clamping position for locking the strap (3) between the basic body clamping bodies (5, 17) which are realized as webs and the third basic body clamping body (4).

15 Claims, 3 Drawing Sheets

(56) References Cited

FOREIGN PATENT DOCUMENTS

| | | |
|---|---|---|
| DE | 1992277 | 8/1968 |
| DE | 1557477 | 4/1970 |
| DE | 82300 | 5/1971 |
| DE | 2115471 | 2/1972 |
| DE | 2245343 | 3/1973 |
| DE | 2419160 | 10/1975 |
| DE | 2552993 | 6/1977 |
| DE | 2928028 | 1/1981 |
| DE | 8213354 | 9/1982 |
| DE | 3346755 | 7/1985 |
| DE | 19712582 | 10/1998 |
| DE | 19829899 | 5/1999 |
| DE | 10119469 | 11/2002 |
| EP | 0043198 | 1/1982 |
| EP | 0111831 | 6/1984 |
| EP | 0925734 | 4/2003 |
| FR | 2556421 | 6/1985 |
| GB | 1066740 | 4/1967 |
| GB | 2244079 | 11/1991 |
| GB | 2295198 | 5/1996 |
| WO | 9961209 | 12/1999 |
| WO | 0035711 | 6/2000 |
| WO | 0037511 | 6/2000 |

* cited by examiner

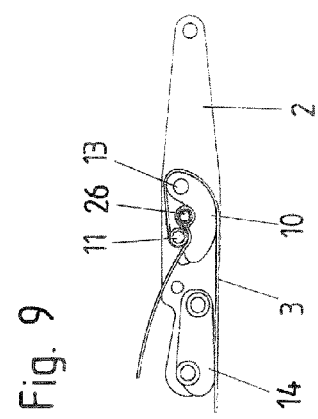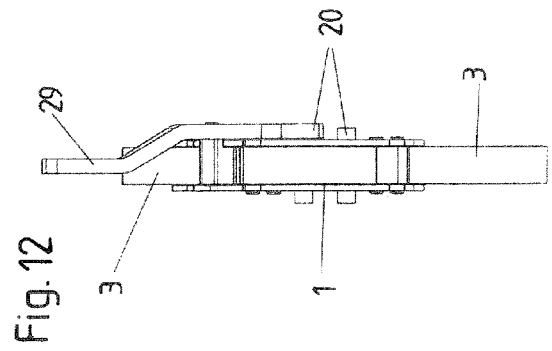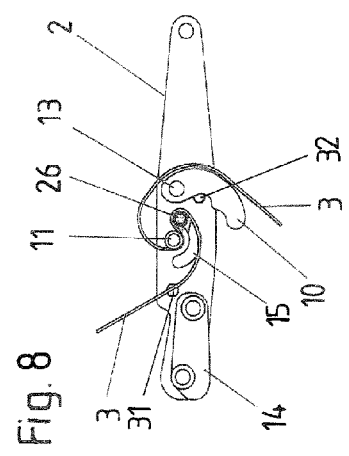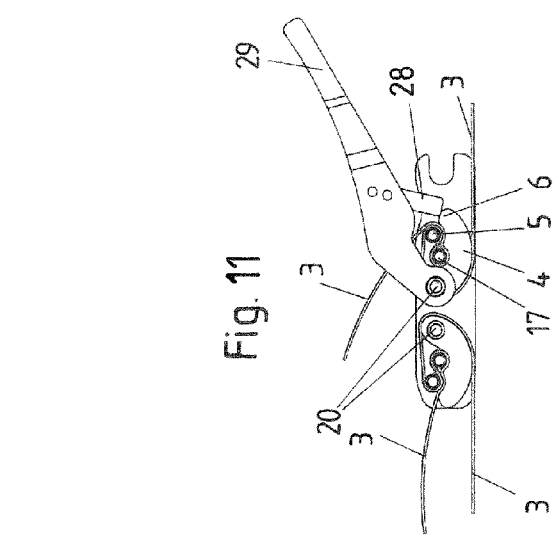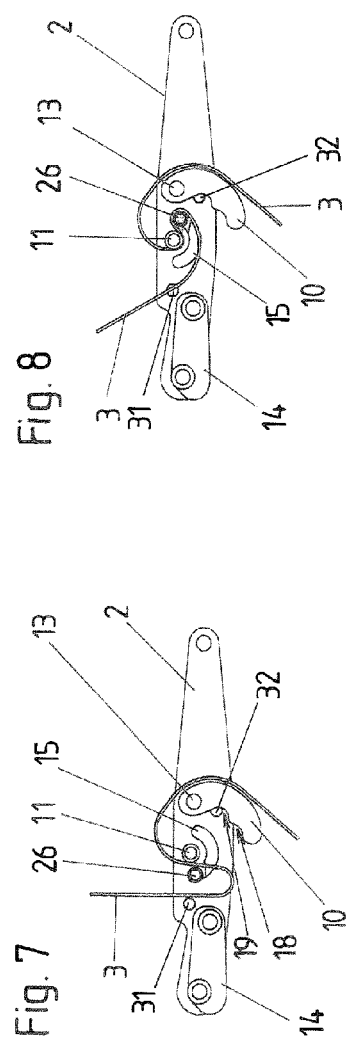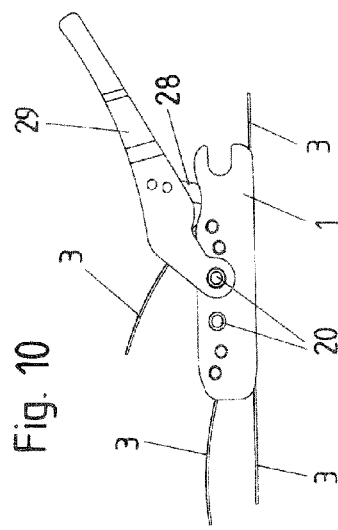

CLAMPING APPARATUS FOR CLAMPING AT LEAST ONE STRAP

INCORPORATION BY REFERENCE

The following documents are incorporated herein by reference as if fully set forth: Austrian Patent Application No. A717/2012, filed Jun. 28, 2012.

BACKGROUND

The present invention relates to a clamping apparatus for clamping at least one strap, wherein the clamping apparatus has a basic body on which are arranged at least two basic body clamping bodies which are realized as webs for winding the strap around.

Generic clamping apparatuses are used, for example, for the purpose of securing a load by means of a tensioned strap or for connecting straps together in another manner. A generic clamping apparatus is known, for example, from DE 25 52 993. The forces required for clamping the strap in the tensioned state are produced essentially from the friction between the basic body clamping bodies which are realized as webs and the belt which is wound around them.

In order to be able to increase the friction and consequently the holding forces on the strap, it is known to provide the basic body clamping bodies with a roughened, for example serrated or undulating surface. The projections of said surfaces are provided for the purpose of being pressed into the strap in order to increase the friction forces in this manner. A disadvantage of said development forms though is that the wear on the strap is increased in this manner.

SUMMARY

It is the object of the invention to propose an alternative method as to how generic clamping apparatuses can make higher holding forces available.

As claimed in the invention, this is achieved by at least one third basic body clamping body, which is realized as a lever which is pivotable in relation to the basic body, being arranged on the basic body, wherein the third basic body clamping body is pivotable into a clamping position for locking the strap between the basic body clamping bodies which are realized as webs and the third basic body clamping body.

It is, therefore, a fundamental concept of the present invention to combine the basic body clamping bodies, which are known per se and are realized as webs, with an additional pivotable basic body clamping body such that, in the clamping position, the third basic body clamping body clamps the strap together with the basic body clamping bodies which are realized as webs. This generates high holding forces on the tensioned strap without roughened surfaces or the like being necessary for this purpose.

The basic body clamping bodies which are realized as webs for winding the strap around can each have a circular cross section. However, other cross sections can also be realized.

To increase the friction forces it is basically favorable to make the friction surfaces available as large as possible. In this sense, preferred development forms of the invention provide that at least one of the, preferably all, basic body clamping bodies has a strap abutment surface which is curved at least in regions, preferably completely, for the abutment of the strap against the respective basic body clamping body.

In addition, it is favorable when the third basic body clamping body is realized as a type of lever which is pivotable about an axis on one side. In said sense it can be provided that the third basic body clamping body is pivotable about an axial pin, which is arranged in a fixed manner preferably in its position on the basic body. Particularly preferred development forms, in this case, provide that the axial pin and the two basic body clamping bodies which are realized as webs for winding the strap around are arranged parallel to one another.

In order to be able to press the strap as effectively as possible and with large friction faces against the basic body clamping bodies which are realized as webs for winding the strap around, preferred variants of the invention provide that at least one of the, and preferably all, basic body clamping bodies has a strap abutment surface which is curved at least in regions, preferably completely, for the abutment of the strap against the respective basic body clamping body.

The basic body clamping bodies which are realized as webs can be so-called fixed webs. In this sense it can be provided that at least one of the, preferably all, basic body clamping bodies realized as webs is or are fixed in its or their position on the basic body. In order to simplify the threading of the strap onto the basic body clamping bodies, it can, however, also be provided that at least one of the basic body clamping bodies which are realized as webs is mounted on the basic body so as to be adjustable, preferably pivotable, in its position in relation to the basic body. Preferred development forms of the invention, in this case, provide that the basic body clamping body which is realized as a web and is mounted on the basic body so as to be adjustable, preferably pivotable, in its position in relation to the basic body, is arranged in the clamping position between the other basic body clamping body which is realized as a web and a or the axial pin about which the third basic body clamping body is pivotable. In this case, it is favorable when said adjustable basic body clamping body which is realized as a web is lockable in at least one position. In this case, this is preferably the position in which it is arranged for clamping the strap. However, as an alternative to this or in addition to it, said adjustable basic body clamping body can also be lockable, for example, in its position in which it is arranged for threading in the strap.

The pivotable basic body clamping body, when viewed in cross section, can be realized in a C-shaped manner and/or can be crescent-shaped.

In principle, it is pointed out that using the clamping apparatuses as claimed in the invention not only straps can be clamped but also cables. Whilst straps are long flexible objects which have a considerably larger width than thickness, cables are provided in the majority of cases with a circular cross section. Their height and their width, therefore, are approximately the same size.

A method as claimed in the invention for clamping at least one strap and/or at least one cable by means of a clamping apparatus as claimed in the invention provides that the strap or the cable is wound around the basic body clamping bodies which are realized as webs and in the clamping position is pressed by means of the third basic body clamping body against the basic body clamping bodies which are realized as webs. It is particularly favorable in terms of high friction forces and consequently also holding forces when, in this case, the strap doubles between at least one of the basic body clamping bodies which are realized as webs and the third basic body clamping body and extends abutting against itself. This generates a particularly effective belt-on-belt friction force or holding force.

BRIEF DESCRIPTION OF THE DRAWINGS

Further features and details of preferred embodiments of the invention are produced from the following description of the figures.

FIGS. 1 to 12 are views of a preferred embodiment of a tensioning apparatus having a clamping apparatus as claimed in the invention.

DETAILED DESCRIPTION OF THE PREFERRED EMBODIMENTS

Figure 1:
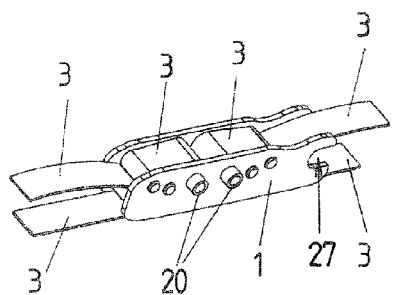
Figure 2:
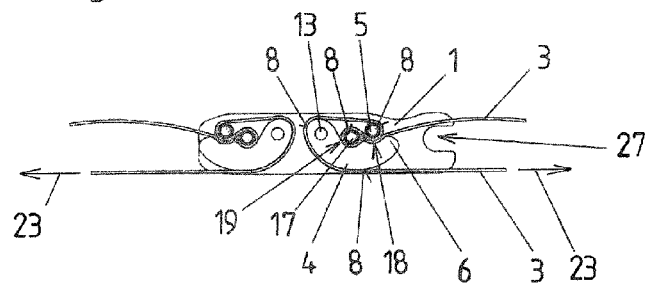

FIGS. 1 and 2 show a perspective representation and a longitudinal section of the clamping apparatus according to the invention. All representations designated here as longitudinal sections are side views where, in each case, a side face of the basic body 1 or of the tensioning lever 2 has been removed or is not shown such that the components lying behind become visible. In said figures, the tensioning lever 2 has been removed from the clamping apparatus or from its basic body 1. In the case of the variants shown here, it is possible to clamp two straps 3 at the same time on the basic body 1 or on the clamping apparatus. In each case, the clamping prevents the straps 3 from being removed from the clamping apparatus or from the basic body 1 in the respective direction 23. This is naturally only an example. The invention can be for clamping apparatuses for only one strap 3 or also for more than two straps 3. The clamping apparatuses as claimed in the invention, as realized in this exemplary embodiment, can be realized as part of a tensioning apparatus with at least one tensioning lever 2 for the tensioning operation. If the strap is only tensioned by hand, that is without any tensioning lever 2, the pivot journal bearing 27 for positioning the tensioning lever 2 can be dispensed with.

As can be seen particularly well in the sectional representation according to FIG. 2, in the case of said clamping apparatus for clamping a strap 3 it is provided that two basic body clamping bodies 5 and 17, which are realized as webs for winding the strap 3 around, are arranged on the basic body 1 of the clamping apparatus, in addition at least one third basic body clamping body 4, which is realized as a lever which is pivotable in relation to the basic body 1, being arranged on the basic body 1, the third basic body clamping body 4 being pivotable into a clamping position for locking the strap 3 between the basic body clamping bodies 5 and 17 which are realized as webs and the third basic body clamping body 4. The achievement here is that in the clamping position, shown in FIG. 2, the pivotable basic body clamping body 4 presses the strap 3 against the two basic body clamping bodies 5 and 17 which are realized as webs. By using two basic body clamping bodies 5 and 17, which are realized as webs, it is possible, as can be seen in FIG. 2, for the strap 3 to double between at least one of the basic body clamping bodies 5 and 17, which are realized as webs, in this case the basic body clamping body 5, and the third, that is the pivotable basic body clamping body 4 and, as a result, to extend abutting against itself. Particularly high clamping forces are achieved by means of said belt-on-belt position in combination with the pressing of the strap 3 by means of the pivotable basic body clamping body 4. In this exemplary embodiment, the two basic body clamping bodies 5 and 17 which are realized as webs for winding the strap 3 around, have a circular cross section, which, however does not necessarily have to be provided. Through the possibility, which is particularly easy to see in FIG. 2, of guiding the strap 3 around said two web-like basic body clamping bodies 5 and 17 and the additional pressing by means of the third basic body clamping body 4, particularly high holding forces and clamping forces are achieved.

Preferred embodiments, as the ones shown here, provide over and above this that the third, that is the pivotable basic body clamping body 4 has recesses 18 and 19 for the at least partial accommodation of the strap 3 and in each case of one of the basic body clamping bodies 5 and 17 which are realized as webs. This increases the clamping forces even more, just as by means of the strap abutment surfaces 8 of the basic body clamping bodies 4, 5 and 17 which are curved at least in regions, preferably completely. All in all, very high holding forces are achieved in this manner without it also being necessary to realize the strap abutment surfaces 8 in a roughened manner, that is with ribs or undulations or the like. This means that the strap 3 is protected in the long-term and its service life is increased without this resulting in losses in the achievable holding forces. The pivotable basic body clamping body 4, in this exemplary embodiment, is mounted so as to be pivotable about a fixed axial pin 13. In a more favorable manner, the axial pin 13 and the basic body clamping bodies 4 and 5 which are realized as webs extend parallel to one another.

Figure 3:
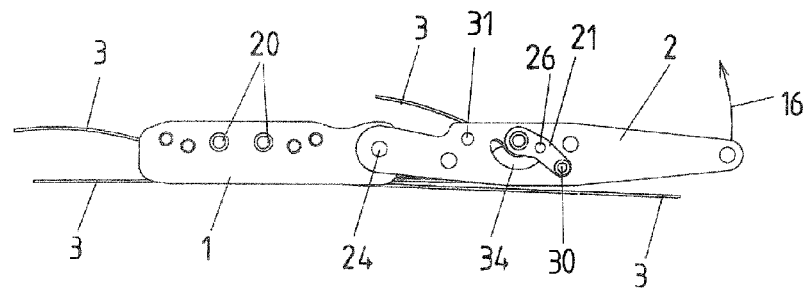
Figure 4:
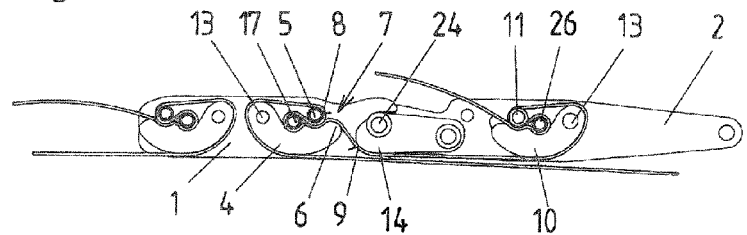

In FIG. 3 and FIG. 4, a tensioning lever 2 for tensioning, that is for increasing the tension forces on the strap 3 is added to said basic body 1 or said clamping apparatus according to FIGS. 1 and 2. In the exemplary embodiment shown here, a simple pivot journal bearing 27, which is realized in the form of a recess which is open on one side, is realized on the basic body 1 for this purpose, into which pivot journal bearing the pivot axis 24 of the tensioning lever 2 is simply able to be inserted. This is, therefore, a tensioning lever 2 which can be fastened on the basic body 1 so as to be releasable, the pivot axis 24 of which just has to be inserted into the pivot journal bearing 27.

Figure 5:
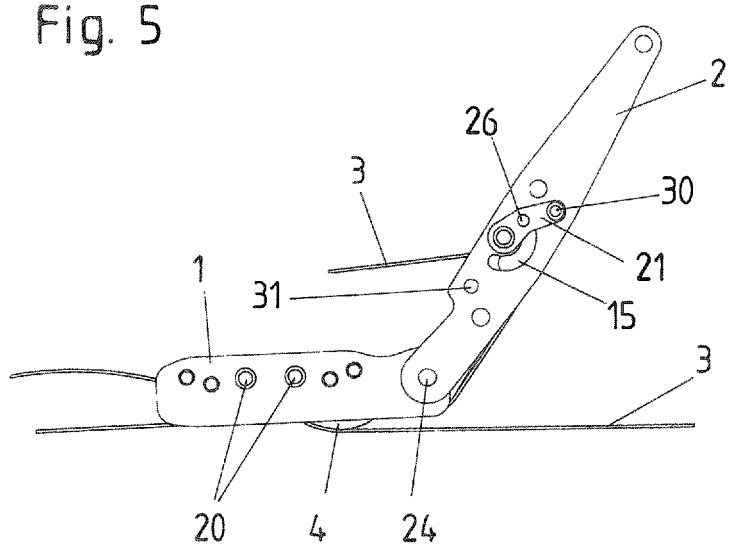
Figure 6:
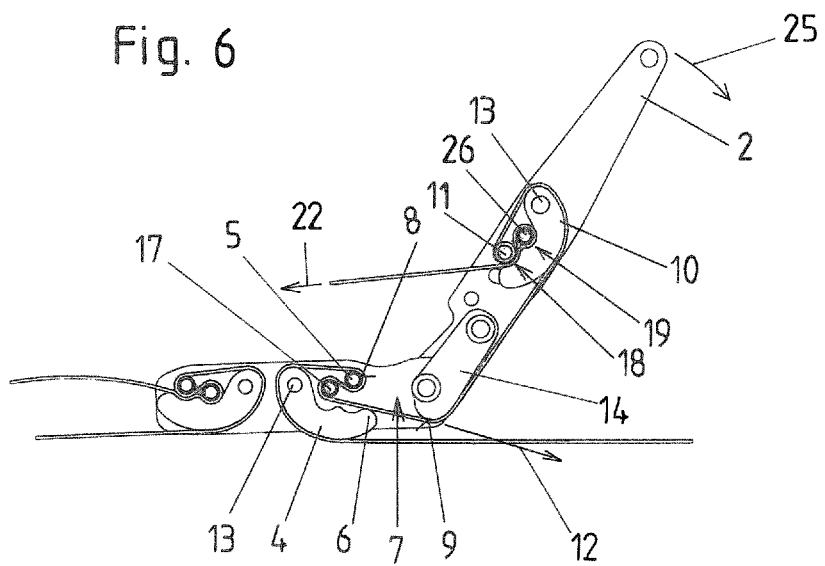

As can be seen particularly well in the longitudinal section according to FIG. 4, the tensioning lever 2 of this exemplary embodiment has a guide connecting link 14 which has a strap abutment surface 9 for the strap 3 which is arranged in an eccentric manner with reference to the pivot axis 24. This type of eccentricity can naturally also be realized in the case of other exemplary embodiments. An opening nose 6 of the pivotably arranged basic body clamping body 4 is arranged in the clamping position according to FIG. 4 of the basic body clamping bodies 4, 5 and 17, for guiding the strap 3 about the opening nose 6, in a space 7 between a strap abutment surface 8 of the basic body clamping body 5 and a strap abutment surface 9 of a tensioning lever clamping apparatus of the tensioning lever 2. This means that during the tensioning operation, that is when pivoting the tensioning lever 2 in the tensioning direction 16, an opening is achieved, that is a pivoting away of the basic body clamping body 4 from the other two basic body clamping bodies 5 and 17, as a result of which the strap 3 is able to be tensioned without being stretched unnecessarily between the basic body clamping bodies 4, 5 and 17 and the tensioning lever clamping apparatus. In this exemplary embodiment, the basic design of and the interaction between the tensioning lever clamping apparatus and the tensioning lever clamping bodies 10, 11 and 26 are constructed as for the basic body clamping bodies 4, 5 and 17. In FIG. 3 and in the associated longitudinal section according to FIG. 4, the tensioning lever 2 is situated in an initial position prior to a tensioning stroke. FIG. 6, which shows a longitudinal section through the situation according to FIG. 5, shows a situation during the tensioning stroke of the tensioning lever 2 in the tensioning direction 16, where the opening nose 6 of the pivotable basic body clamping body 4 has already been pressed out of the space 7 by the strap 3 and, as a result, the pivotable basic body clamping body 4 has been pivoted into a release position in which the strap 3 is able to be pulled through between the basic body clamping bodies 4, 5 and 17.

The tensioning operation is depicted below by way of a comparison between FIGS. 4 and 6. In this case, the state according to FIG. 4 is the starting point. In said state, the basic body clamping bodies 4, 5 and 17 are situated in their clamping position in which, as depicted in the introduction, they clamp the strap 3. The opening nose 6, around which the strap 3 is guided or diverted, is situated in a space 7 between the strap abutment surface 8 of the basic body clamping body 5 and a strap abutment surface 9 of the tensioning lever clamping apparatus, here the guide connecting line 14. In the initial position shown in FIG. 4, at the start of a tensioning or pivoting operation in the tensioning direction 16, the tensioning lever clamping apparatus has already been closed, the strap 3 is consequently already locked between the tensioning lever clamping bodies 10, 11 and 26. If then, proceeding from FIG. 4, for introducing a tensioning stroke or tensioning operation, the tensioning lever 2 is pivoted about its pivot axis 24 in the tensioning direction 16, the strap 3 is pulled in the direction 12 shown in FIG. 10. This results in the opening nose 6 being pressed out of the space 7 by the strap 3 guided around it, as a result of which, the basic body clamping body 4 is pivoted into a release position in which the strap 3 is released by, that is no longer clamped by the basic body clamping bodies 4, 5 and 17. This situation is shown as an example in FIG. 6. The achievement here is that the basic body clamping bodies 4, 5 and 17 open rapidly during the tensioning stroke and consequently a large part of the pivot path in the tensioning direction 16 is actually used for re-tensioning or retightening the strap 3 in the direction 12 and is not lost by the stretching of the strap 3. In this regard, a relatively large portion of the strap 3 is therefore always conveyed per tensioning stroke, as a result of which a relatively large increase in the tensioning of the strap 3 is able to be achieved per tensioning stroke. This effect of the rapid opening by means of the opening nose 6, in this exemplary embodiment as also in other preferred exemplary embodiments, is reinforced even more by the eccentricity of the guide connecting link 14 or of the strap abutment surface 9 thereof with reference to the pivot axis 24. In this sense it is favorable, as also realized in this case, for the strap 3, by means of the eccentricity of the guide connecting link 14 or of its strap abutment surface 9, to be guided more strongly around the opening nose 6 at the start of the tensioning stroke of the tensioning lever 2 when the basic body clamping bodies 4, 5 and 17 are situated in their clamping position, than if the strap 3 were to extend directly along the pivot axis 24. The further advantage of the selected eccentricity of the strap abutment surface 9 of the guide connecting link 14 is that the basic body clamping bodies 4, 5 and 17 are reset back into their clamping position again more rapidly at the end of the tensioning stroke of the tensioning lever 2. This prevents any tensioning path being lost when the tensioning lever 2 pivots back in the opposite direction 25. In addition, the eccentricity of the strap abutment surface 9 of the guide connecting link 14 reduces the manual force required by the user during the tensioning stroke. At the end of the tensioning stroke, the tensioning lever 2 can no longer be pivoted further in any case in the tensioning direction 16. It is then pivoted back in the opposite direction 25 into the position according to FIG. 4 to prepare for the next tensioning stroke. The strap 3, in this case, can then be retightened by hand insofar as necessary in the direction 22 between the open tensioning lever clamping bodies 10 and 11 and 26, whilst, in their clamping position according to FIG. 4, the basic body clamping bodies 4, 5 and 17 hold the strap 3 in the tensioned position. The tensioning operation depicted can be repeated as often as is necessary for tensioning the strap 3 such that a type of endless tensioning apparatus is created where the maximum possible tensioning path of the strap 3 is not restricted by the tensioning lever clamping apparatus.

As already explained, the essential features of the tensioning lever clamping apparatus with its tensioning lever clamping bodies 10, 11 and 26 are realized analogously to the basic body clamping bodies 4, 5 and 17. The method of operation of said tensioning lever clamping apparatus corresponds to the interaction between the basic body clamping bodies 4, 5 and 17 as does the respective design. In this case too, in the clamping position the tensioning lever clamping body 10, which is mounted on the tensioning lever 2 so as to be pivotable, presses the strap 3 against the two other tensioning lever clamping bodies 11 and 26. Here too, the strap 3 abuts directly against itself, as a result of which overall particularly high clamping forces are obtained in the clamping position. In this sense, the tensioning lever 2 of this exemplary embodiment can also be viewed as claimed in the invention as a clamping apparatus for clamping a strap 3, the clamping apparatus having a basic body in the form of the corresponding portions of the tensioning lever 2, on which are arranged at least two basic body clamping bodies which are realized as webs for winding the strap 3 around, here in the form of the tensioning lever clamping bodies 11 and 26, at least one third basic body clamping body, which is realized so as to be pivotable in relation to the tensioning lever 2, in the form of the tensioning lever clamping body 10 being arranged on the basic body in the form of the tensioning lever 2, said third basic body clamping body in the form of the tensioning lever clamping body 10 being pivotable into a clamping position for locking the strap 3 between the tensioning lever clamping bodies 11 and 26, which are realized as webs, and the third tensioning lever clamping body 10.

To make it easier to thread the strap between the three basic body clamping bodies 4, 5 and 17 or the tensioning lever clamping bodies 10, 11 and 26, at least one of the basic body clamping bodies, which are realized as webs, or tensioning lever clamping bodies 26 can be mounted on the basic body so as to be adjustable in its position in relation to the basic body 1 or to the tensioning lever 2. In the exemplary embodiment shown in this case, this is realized, as an example, on the tensioning lever 2 or on the tensioning lever clamping apparatus by the tensioning lever clamping body 26, which is realized as a web, being able to be pivoted in the elongated hole 15 by means of the pivot lever 21. FIG. 7, in this case, shows the position of the tensioning lever clamping body 26 in which the strap 3 is able to be threaded through between the tensioning lever clamping bodies 10, 11 and 26 in a particularly simple manner. In FIG. 8 the adjustable tensioning lever clamping body 26 has been pivoted back again into its operating position in which it is arranged between the fixed, web-like tensioning lever clamping body 11 and the axial pin 13 of the pivotable tensioning lever clamping body 10. The adjustable tensioning lever clamping body 26, which is realized as a web, is lockable in at least one position. In the exemplary embodiment shown, it is lockable in its two end positions. In this case, this is, on the one hand, the position in which it is arranged for clamping the strap 3. In addition to this, said adjustable tensioning lever clamping body 26 can also be locked, however, for example, in its position in which it is arranged for threading in the strap 3. In the exemplary embodiment shown, this is achieved by means of a latching pin which is pretensioned by means of a spring. This spring is situated on the handle part 30 of the pivot lever 21 and in the named end positions latches into the holes 31 and 32 in order to achieve the desired locking of the tensioning lever clamping body 26 in a corresponding manner. To release said locking, the handle part 30 is pulled such that the latching pin (not visible here) is pulled out of the respective hole 31 or 32 and consequently the locking is lifted.

FIG. 9 shows the clamping position in which the pivotable tensioning lever clamping body presses the strap 3 against the two web-like tensioning lever clamping bodies 11 and 26. Even if this is not shown explicitly here, it is nevertheless clear that the basic body clamping body 17 can also be pivotably mounted analogously to the tensioning lever clamping body 26 in order to make threading in the strap 3 easier.

FIGS. 10, 11 and 12 show a release lever 29 for this exemplary embodiment. This release lever is fitted laterally onto one of the journals 20 of the basic body 1. It has a release web 28, by way of which, for opening, it acts on the opening nose 6 of the pivotable basic body clamping body 4. The one-sided fastening of the release lever 29 of this exemplary embodiment can be seen particularly well in the top view according to FIG. 12.

Finally, it must also be pointed out that even if the exemplary embodiment depicted here in detail refers to the use with a strap 3, clamping apparatuses as claimed in the invention are also nevertheless completely suitable for the corresponding tensioning or clamping of cables.

KEY TO THE REFERENCE NUMERALS

1 Basic body
2 Tensioning lever
3 Strap
4 Basic body clamping body
5 Basic body clamping body
6 Opening nose
7 Space
8 Strap abutment surface
9 Strap abutment surface
10 Tensioning lever clamping body
11 Tensioning lever clamping body
12 Direction
13 Axial pin
14 Guide connecting link
15 Elongated hole
16 Tensioning direction
17 Basic body clamping body
18 Recess
19 Recess
20 Journal
21 Pivot lever
22 Direction
23 Direction
24 Pivot axis
25 Opposite direction
26 Tensioning lever clamping body
27 Pivot journal bearing
28 Release web
29 Release lever
30 Handle part
31 Hole
32 Hole

The invention claimed is:

1. A clamping apparatus for clamping at least one strap, comprising:
    a basic body on which are arranged at least two basic body clamping bodies which are realized as webs for winding the strap around, and at least one third basic body clamping body which comprises a lever that is pivotable in relation to the basic body and is arranged on the basic body, the third basic body clamping body is pivotable into a clamping position for locking the strap between the basic body clamping bodies which are realized as the webs and the third basic body clamping body; and
    a strap wound around the two basic body clamping bodies which are realized as webs and clamped thereto by the third basic body clamping body,
    wherein the third basic body clamping body abuts the strap on a side of the strap that faces away from both of the two basic body clamping bodies which are realized as webs.

2. The clamping apparatus as claimed in claim 1, wherein the third basic body clamping body is pivotable about an axial pin.

3. The clamping apparatus as claimed in claim 2, wherein the axial pin is arranged in a fixed manner on the basic body.

4. The clamping apparatus as claimed in claim 1, wherein the third basic body clamping body has recesses for at least a partial accommodation of the strap and of in each case one of the basic body clamping bodies which are realized as webs.

5. The clamping apparatus as claimed in claim 1, wherein at least one of the basic body clamping bodies has a strap abutment surface which is curved at least in regions for the abutment of the strap against the respective basic body clamping body.

6. The clamping apparatus as claimed in claim 5, wherein all of the basic body clamping bodies have respective ones of the strap abutment surfaces.

7. The clamping apparatus as claimed in claim 1, wherein at least one of the basic body clamping bodies which are realized as the webs is fixed in position on the basic body.

8. The clamping apparatus as claimed in claim 7, wherein all of the basic body clamping bodies which are realized as the webs are fixed in position on the basic body.

9. The clamping apparatus as claimed in claim 1, wherein at least one of the basic body clamping bodies which are realized as webs is mounted on the basic body adjustable in position in relation to the basic body.

10. The clamping apparatus as claimed in claim 9, wherein the at least one of the basic body clamping bodies which are realized as webs that is mounted on the basic body adjustable in position in relation to the basic body is pivotable.

11. The clamping apparatus as claimed in claim 9, wherein the basic body clamping body, which is realized as a web and is mounted on the basic body so as to be adjustable in position in relation to the basic body, is arranged in the clamping position between the other basic body clamping body which is realized as a web and an axial pin about which the third basic body clamping body is pivotable.

12. The clamping apparatus as claimed in claim 1, wherein the third basic body clamping body is pivotable, and when viewed in cross section, is C-shaped or crescent-shaped.

13. A method for clamping at least one of a strap or a cable by using a clamping apparatus, comprising:
    providing the clamping apparatus having a basic body on which are arranged at least two basic body clamping bodies which are realized as webs for winding the strap around, and at least one third basic body clamping body which comprises a lever that is pivotable in relation to the basic body and is arranged on the basic body, the third basic body clamping body is pivotable into a clamping position for locking the strap between the basic body clamping bodies which are realized as the webs and the third basic body clamping body;
    winding the strap or the cable around the basic body clamping bodies which are realized as the webs and in the clamping position; and via the third basic body clamping body, pressing the strap or the cable against the basic body clamping bodies which are realized as the webs.

14. The method as claimed in claim 13, wherein the strap doubles between at least one of the basic body clamping bodies which are realized as the webs and the third basic body clamping body and extends abutting against itself.

15. The method as claimed in claim 13, wherein the third basic body clamping body abuts the strap on a side of the strap that faces away from both of the two basic body clamping bodies which are realized as webs.

* * * * *